Nov. 4, 1947. S. H. KURFISS 2,430,178
FLOATING AIRPLANE FIELD
Filed March 9, 1946 2 Sheets-Sheet 1

INVENTOR.
SELBY H. KURFISS
BY
ATTORNEY

Nov. 4, 1947.  S. H. KURFISS  2,430,178
FLOATING AIRPLANE FIELD
Filed March 9, 1946  2 Sheets-Sheet 2
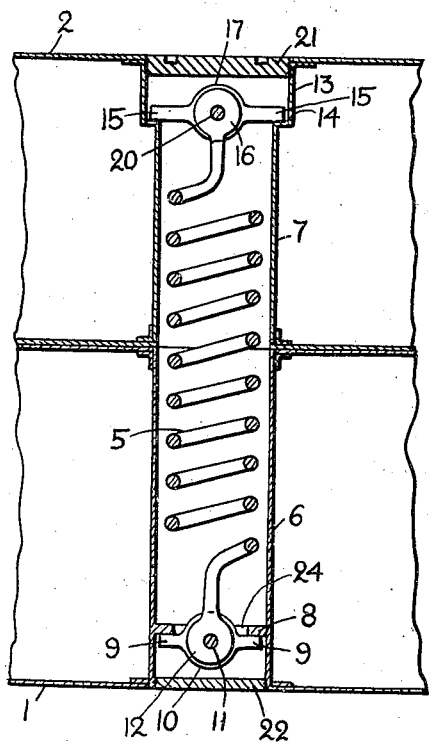
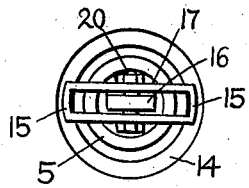
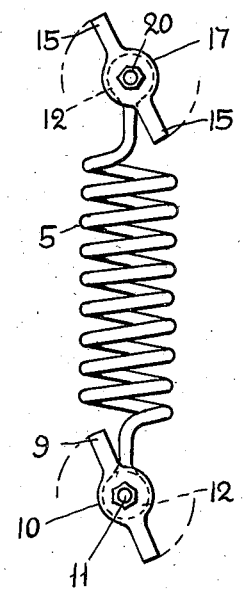
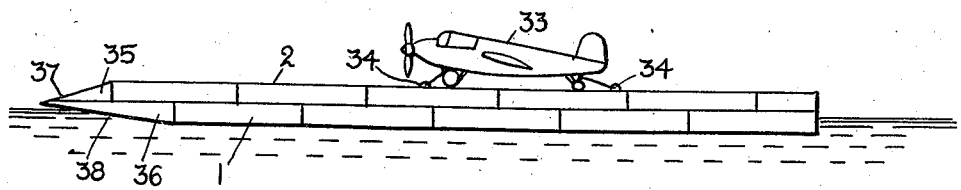
INVENTOR.
SELBY H. KURFISS
BY John P. Nikonow
ATTORNEY Patented Nov. 4, 1947

2,430,178

UNITED STATES PATENT OFFICE 2,430,178

FLOATING AIRPLANE FIELD

Selby H. Kurfiss, Kansas City, Mo.

Application March 9, 1946, Serial No. 653,332

8 Claims. (Cl. 114—43.5)

My invention relates to floating airplane fields and has particular reference to airplane fields and similar floating structures.

My invention has for its object to provide an airplane field or a floating transport which is composed of individual units, preferably of standardized simple geometrical contours abutting each other to form a substantially flat large body adapted to float on the surface of water and to serve as an airplane field, floating transport, etc. I prefer to build such a body in at least two layers of such units in the form of barges or pontoons, the joints between the abutting units of the upper layer being staggered relative to the joints of the lower layer.

Another object of my invention is to provide means to yieldably and resiliently join together the upper and lower units in a plurality of places so that the entire structure will have a tendency to remain flat, but will be yieldably deflected under load or under action of the waves.

Another object of my invention is to provide means to detachably connect the yieldable joining means with the individual units so that the units can be easily and quickly assembled into the complete field, and damaged units can be quickly detached and discarded.

Another object of my invention is to provide end units for the field of a tapering or chamfered shape so that they will deflect torpedoes if the airplane field is being towed or propelled in waters where enemy submarines or torpedo-carrying planes are present.

The foregoing and other objects, advantages and features of my invention are more fully described in the following specification and drawings in which:

Fig. 5 is a sectional elevational view of a resilient connection between the units of the lower and upper layers;

Fig. 6 is a top plan view of the same;

Fig. 7 is a detail view of a spring for connecting the units; and

Fig. 8 is a fractional view of the end portion of a floating field.

Figure 1:
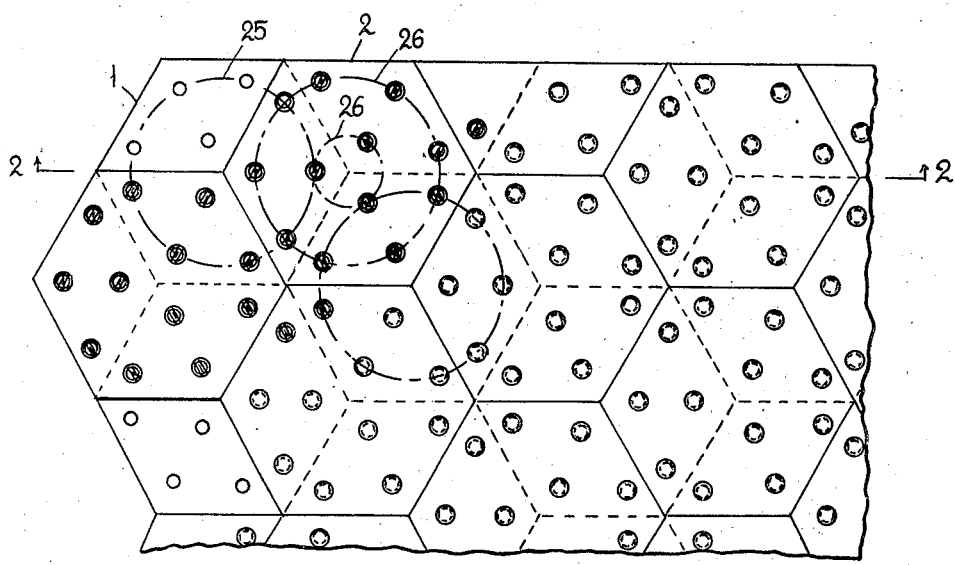
Fig. 1 is a fractional top plan view of my field formed of hexagonal units.
Figure 2:
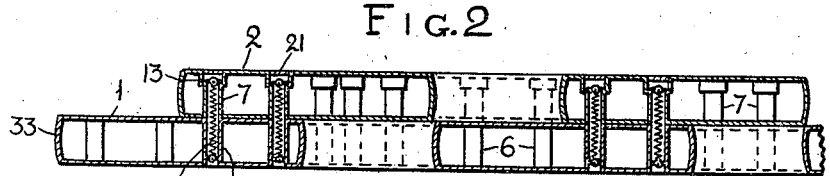
Fig. 2 is a fractional sectional elevational view of the same.

My airplane field, as shown in Figs. 1, 2, 5, 6 and 7, consists of a plurality of barges or pontoons 1, 2 which may be made of metal, plywood, wood, or other suitable material. Each pontoon represents an element of the complete structure so interconnected that it forms a flat surface of a desired area and, while possessing a certain flexibility in all directions, has a tendency to remain flat and to return to its flat form when temporarily distorted by outside forces as, for instance, by waves.

The pontoons in the particular form shown in the drawings by way of an example are of a hexagonal shape so that each pontoon abuts the other pontoons on six sides. To render the structure more resistant to deformation and to increase its load-bearing capacity, I provide two layers of such pontoons, although three or more layers may be employed if desired. The two layers are so arranged that the joints of one layer are staggered relative to the joints of the other layer so that every joint of one layer is covered by a solid body of a pontoon of the next layer. The pontoons of the two layers are resiliently connected together by springs 5 placed in coaxially arranged tubular members 6, 7 in the lower and upper pontoons, as shown more clearly in Figs. 5, 6 and 7. The tubular members or shells 6, 7 are welded or otherwise secured to the edges of the corresponding openings in the walls of the pontoons so as to render the pontoons watertight. The shell 6 is provided with an inner annular flange 8 supporting arms 9 of a yoke 10. A bolt 11 passes through the central portion of the yoke and pivotally supports the lower end portion 12 of the spring 5. The upper portion 13 of the shell 7 is of a larger diameter than the shell 7, forming a shoulder 14 on which rest legs 15 of an upper yoke 17. A bolt 20 passes through the central portion of the yoke and pivotally supports the upper end 16 of the spring 5. A threaded plug 21 closes the opening of the enlarged shell portion 13. A similar plug 22 may be provided for the lower end of the lower shell 6 to prevent barnacles and other sea life from entering the shells.

For placing the spring in position, its yokes 10 and 17 are turned to the side, as shown in Fig. 7, thus making it possible to insert the lower yoke into the opening 24 in the flange 8, whereupon the yoke is turned into its normal position at right angles to the axis of the spring 5, as shown in Fig. 5. The spring is then stretched for bringing the upper yoke 17 above the shoulder 14, and the yoke 17 is placed in an operative position at right angles to the axis of the spring 5.

The tubular shells 6, 7 are arranged at points of intersection of circles 25 and 26, as shown in Fig. 1, so that all pontoons have the same pattern of spacing of the spring shells. Thus, every upper pontoon is connected at one third of its surface to a corresponding one third of an underlying pontoon by three springs 5 lying on the circle 25, and one spring 5 on a small circle 26. The springs hold firmly together the upper and lower layers of the pontoons, but allow a certain degree of freedom of relative movement, such as may be caused by waves on an ocean or lake. Because of the tension of the springs, however, the wave motion will be absorbed by the outer fringes of the field so that the inner portion will remain relatively quiet and suitable for use as a landing field for airplanes even during relatively high seas. The resilient connections between the pontoons also prevent any structural damage to the units when irregularly distributed forces are applied to the field. The edges of the pontoons may be rounded at 33 to facilitate the flexure of the field.

Figure 3:
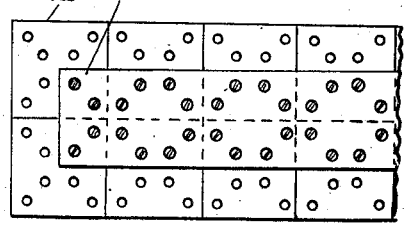
Fig. 3 is a fractional top plan view of a modified construction employing square or rectangular units.
Figure 4:
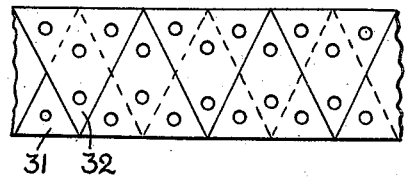
Fig. 4 is a similar view of another modification employing triangular units.

While the hexagonal shape of the pontoons has certain advantages, it may be replaced by other geometric shapes if desired as, for instance, by rectangular (or square) pontoons 29, 30, Fig. 3, or triangular pontoons 31, 32, Fig. 4. Triangular or prism-shaped pontoons can be also used at the marginal portions of the hexagonal structure shown in Fig. 1, if desired to obtain straight edges of the field.

Due to its elasticity, the entire structure possesses great strength and load-carrying capacity, so that it can be also used for transporting war and other material, troops, etc. The field may be towed by power boats or it may be made self-propelling as by placing one or several airplanes 33 as shown in Fig. 8 and lashing them at 34 to the surface of the field, for using the airplane propellers as a motive power for the unit.

When used in time of war, the front pontoons 35, 36 may be tapered at 37, 38 to provide deflecting surfaces for torpedoes so that the latter can be safely beached without exploding.

Should any of the front pontoons be damaged by the enemy action, they may be quickly detached and discarded.

To protect the main body of the field, a lighter field may be sent ahead with trawls for removing mines. Any damage to such light pontoons by the mines can be quickly repaired or the damaged pontoons disconnected (by removing the upper bolts 20) and discarded.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A floating body comprising a plurality of pontoons arranged in superimposed layers, the pontoons of the lower layer being staggered relative to the pontoons of the upper layer; and yieldable resilient means to join the lower pontoons with the upper pontoons, thereby forming a substantially flat body yieldably resisting deflections.

2. A floating body comprising a plurality of pontoons of a uniform size and of a simple geometric shape arranged in superimposed layers, the pontoons of each layer abutting each other at the sides, the pontoons of different layers being staggered in relation to each other; and yieldable means to join the upper and lower pontoons.

3. A floating body comprising a plurality of substantially flat pontoons of a uniform size and of a polygonal shape arranged in at least two superimposed layers, the pontoons of one layer abutting each other at the edges, the lower pontoons being staggered relative to the upper pontoons; and a plurality of yieldable resilient members connecting together the upper and lower pontoons.

4. A floating body comprising a plurality of substantially flat pontoons of a uniform size and of a polygonal shape arranged in at least two superimposed layers, the pontoons of one layer abutting each other at the edges, the lower pontoons being staggered relative to the upper pontoons; and a plurality of springs connecting together the lower and upper pontoons, thereby forming a substantially flat body yieldably resisting deformations.

5. A floating body comprising a plurality of substantially flat pontoons of a uniform size and of a polygonal shape arranged in at least two superimposed layers, the pontoons of one layer abutting each other at the edges, the lower pontoons being staggered relative to the upper pontoons; and a plurality of springs connecting together the lower and upper pontoons, thereby forming a substantially flat body yieldably resisting deformations, the abutting edges of the pontoons being rounded.

6. A floating body comprising a plurality of pontoons arranged in superimposed layers, the pontoons of the lower layer being staggered relative to the pontoons of the upper layer; tubular members transversely secured in the pontoons, the tubular members of the upper pontoons registering with the tubular members of the lower pontoons; and springs supported under tension in the tubular members for yieldably holding together the upper and lower pontoons.

7. A floating body comprising a plurality of pontoons arranged in superimposed layers, the pontoons of the lower layer being staggered relative to the pontoons of the upper layer; tubular members transversely secured in the pontoons, the tubular members of the upper pontoons registering with the tubular members of the lower pontoons; the outer portions of the tubular members having shoulders; helical springs in the tubular members; and yokes at the ends of the springs engaging the shoulders, yieldingly holding together the upper and lower pontoons.

8. A floating body comprising a plurality of pontoons of a uniform size and of a simple geometric shape arranged in superimposed layers, the pontoons of each layer abutting each other at the sides, the pontoons of different layers being staggered in relation to each other; yieldable means to join the upper and lower pontoons; means to support airplanes on the upper pontoons for propelling the body over the surface of the water, the front pontoons having tapering front portions.

SELBY H. KURFISS.